US012103421B2

(12) United States Patent
Chen et al.

(10) Patent No.: US 12,103,421 B2
(45) Date of Patent: Oct. 1, 2024

(54) CHARGING MANAGEMENT METHODS AND SYSTEMS FOR ELECTRIC VEHICLE CHARGING STATIONS

(71) Applicant: Noodoe Group Inc., Wilmington, DE (US)

(72) Inventors: Wen-Nan Chen, Taipei (TW); En-Yu Shih, Taipei (TW)

(73) Assignee: Noodoe Group Inc., Wilmington, DE (US)

( * ) Notice: Subject to any disclaimer, the term of this patent is extended or adjusted under 35 U.S.C. 154(b) by 479 days.

(21) Appl. No.: 17/504,588

(22) Filed: Oct. 19, 2021

(65) Prior Publication Data

US 2022/0242262 A1   Aug. 4, 2022

(30) Foreign Application Priority Data

Jan. 29, 2021   (TW) ................. 110103561

(51) Int. Cl.
*B60L 53/62*   (2019.01)
*B60L 53/63*   (2019.01)
*B60L 53/66*   (2019.01)
*B60L 53/67*   (2019.01)
*B60L 53/68*   (2019.01)

(52) U.S. Cl.
CPC ............. *B60L 53/62* (2019.02); *B60L 53/63* (2019.02); *B60L 53/66* (2019.02); *B60L 53/67* (2019.02); *B60L 53/68* (2019.02)

(58) Field of Classification Search
CPC .......... B60L 53/62; B60L 53/63; B60L 53/66; B60L 53/67; B60L 53/68
See application file for complete search history.

(56) References Cited

U.S. PATENT DOCUMENTS

2021/0122257 A1* 4/2021 Lee .................. B60L 53/62
2022/0340024 A1* 10/2022 Chen ................ H02J 50/12

FOREIGN PATENT DOCUMENTS

EP    2902250 A2 * 8/2015 .......... B60L 11/1816

OTHER PUBLICATIONS

Machine translation of EP-2902250-A2 (Year: 2024).*

* cited by examiner

*Primary Examiner* — David V Henze-Gongola
(74) *Attorney, Agent, or Firm* — McClure, Qualey & Rodack, LLP

(57) ABSTRACT

Charging management methods and systems for electric vehicle charging stations for use in a charging field with charging stations are provided. First, a server instructs a first charging station to perform a first charging operation for a first electric vehicle via a network, wherein the server sets a first target power parameter value corresponding to the first charging operation, and the power output from the first charging station to the first electric vehicle in the first charging operation will not exceed the first target power parameter value. The server monitors a first power output value actually output from the first charging station to the first electric vehicle during the first charging operation, and determines whether to adjust the first target power parameter value of the first charging operation according to the first power output value and the first target power parameter value.

11 Claims, 8 Drawing Sheets

CHARGING MANAGEMENT METHODS AND SYSTEMS FOR ELECTRIC VEHICLE CHARGING STATIONS

BACKGROUND OF THE INVENTION

Field of the Invention

The disclosure relates generally to charging management methods and systems for electric vehicle charging stations, and, more particularly to charging management methods and systems that can dynamically allocate power output based on the charging demand in a charging field.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Most of the power facility in the field has already been constructed. It is expensive to update the power facility, such as the capacity of the electric panel, and the construction time is very time-consuming. Generally, the number of electric vehicle charging stations that can be installed in a single charging field is limited by the existing maximum load capacity of the existing field. Therefore, in the case of limited electric vehicle charging stations, the driver of an electric vehicle may have to wait time because the charging station is in use, or need to find other nearby charging stations for charging operations, which causes inconvenience in use, and reduces the willingness to adopt electric vehicles.

Therefore, under the premise of not updating the power facility, some charging sites can implement load adjustment operation to increase the number of electric vehicle charging stations that can be installed in the field. In the load adjustment operation, more electric vehicles can be charged in this charging field at the same time by reducing the power output of respective electric vehicle charging stations. However, due to the communication limitations between the electric vehicle charging station and the electric vehicle, field power trips often occur during load adjustment operations when the incoming vehicles request to perform charging operations, resulting in the suspension or interruption of the electric vehicles in the charging operations. On the other hand, since the electricity demands of electric vehicles in the charging operation are not constant, in some cases, the required power will decrease when the battery is close to the fully charged state. Therefore, the power management for the charging field can be more efficient if the battery charging feature can be fully considered.

BRIEF SUMMARY OF THE INVENTION

In a charging management method for electric vehicle charging stations for use in a charging field with charging stations are provided. First, a server instructs a first charging station to perform a first charging operation for a first electric vehicle via a network, wherein the server sets a first target power parameter value corresponding to the first charging operation, and the power output from the first charging station to the first electric vehicle in the first charging operation will not exceed the first target power parameter value. The server monitors a first power output value actually output from the first charging station to the first electric vehicle during the first charging operation, and determines whether to adjust the first target power parameter value of the first charging operation according to the first power output value and the first target power parameter value.

An embodiment of a charging management system for electric vehicle charging stations for use in a charging field with charging stations comprises a first charging station and a server. The server connects to the respective electric vehicle charging stations via a network, and instructs the first charging station to perform a first charging operation for a first electric vehicle via the network, wherein the server sets a first target power parameter value corresponding to the first charging operation, and the power output from the first charging station to the first electric vehicle in the first charging operation will not exceed the first target power parameter value. The server monitors a first power output value actually output from the first charging station to the first electric vehicle during the first charging operation, and determines whether to adjust the first target power parameter value of the first charging operation according to the first power output value and the first target power parameter value.

In some embodiments, the server further determines whether the first power output value is lower than the first target power parameter value for a predetermined time, and reduces the first target power parameter value to a second target power parameter value when the first power output value is lower than the first target power parameter value for the predetermined time.

In some embodiments, the server further sets the second target power parameter value according to the first power output value and a buffer value, wherein the second target power parameter value is greater than the first power output value.

In some embodiments, the server further continuously monitors the first power output value actually output by the first charging station to the first electric vehicle during the first charging operation via the network, determines whether the first power output value has changed, and re-sets the second target power parameter value according to the changed first power output value and the buffer value when the first power output value changes.

In some embodiments, the server further instructs a second charging station among the electric vehicle charging stations to perform a second charging operation for a second electric vehicle via the network, wherein the server sets a third target power parameter value corresponding to the second charging operation, and the power output from the second charging station to the second electric vehicle in the second charging operation is not greater than the third target power parameter value, and increases the third target power parameter value corresponding to the second charging operation according to a difference between the first target power parameter value and the second target power parameter value.

In some embodiments, the server further determines whether to perform the adjustment operation corresponding to the first target power parameter value according to the number of at least one specific charging station being used in the electric vehicle charging stations, a upper power limit value of the at least one specific charging station, and a power limit of the charging field.

In some embodiments, the server further performs the adjustment operation corresponding to the first target power parameter value when a value of the upper power limit value multiplied by the number of the at least one specific charging station being used is greater than the power limit of the charging field.

Charging management methods for electric vehicle charging stations may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
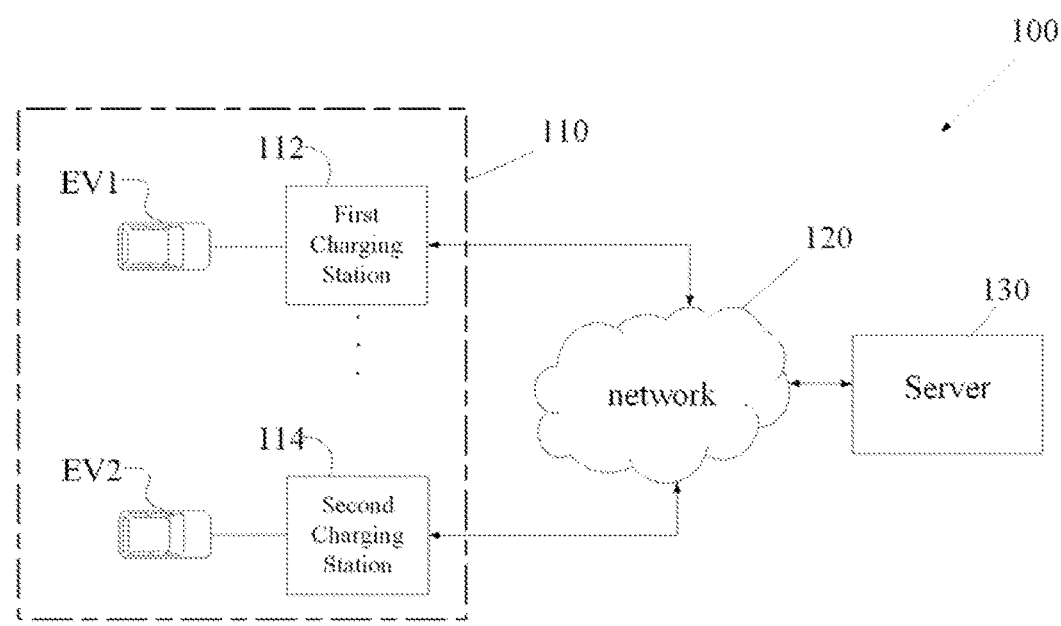
FIG. 1 is a schematic diagram illustrating an embodiment of a charging management system for electric vehicle charging stations of the invention.

FIG. 1 is a schematic diagram illustrating an embodiment of a charging management system for electric vehicle charging stations of the invention. The charging management system for electric vehicle charging stations 100 can be used in a charging filed 110 with a plurality of electric vehicle charging stations. It is noted that, the charging filed 110 has a power limitation. As shown in FIG. 1, the charging management system for electric vehicle charging stations 100 comprises at least one first charging station 112, a second charging station 114, and a server 130 respectively connected with the first charging station 112 and the second charging station 114 via a network 120. The respective charging stations can provide electric vehicles (EV1, EV2) for charging operations. In some embodiments, the network 120 may be a wired network, a telecommunication network, and a wireless network, such as a Wi-Fi network. The server 130 can receive various data from the first charging station 112 and the second charging station 114 via the network 120, and transmit related signals to the first charging station 112 and the second charging station 114. The first charging station 112 and the second charging station 114 can perform related operations according to the signals received from the server 130. For example, when the electric vehicle EV1 is coupled to the first charging station 112 through a charging gun of the first charging station 112 for a charging operation, the first charging station 112 can continuously transmit charging information corresponding the charging operation of the electric vehicle EV1 via the network 120, and the server 130 can receive the charging information of the corresponding charging operation from the first charging station 112 via the network 120. Similarly, when the electric vehicle EV2 is coupled to the second charging station 114 through a charging gun of the second charging station 114 to perform a charging operation, the second charging station 114 can continuously transmit the charging information corresponding the charging operation of the electric vehicle EV2 via the network 120, and the server 130 can receive the charging information of the corresponding charging operation from the second charging station 114 via the network 120.

It is noted that the user can connect the electric vehicle EV1 and the first charging station 112 to each other, such as inserting a charging gun into the charging port of the electric vehicle to send a charging request corresponding to the first charging station 112 to use the first charging station 112. The first charging station 112 performs a charging operation for the electric vehicle EV1. Similarly, the user can connect the electric vehicle EV2 and the second charging station 114 to each other, such as inserting a charging gun into the charging port of the electric vehicle to send a charging request corresponding to the second charging station 114 to use the second charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the first charging station 112 via the network 120, so that the first charging station 112 outputs power to the electric vehicle EV1, such as an electric scooter or an electric car, which is electrically connected to it, or prohibits the first charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the first charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle. The details of the load adjustment operation will be described later.

Figure 2:
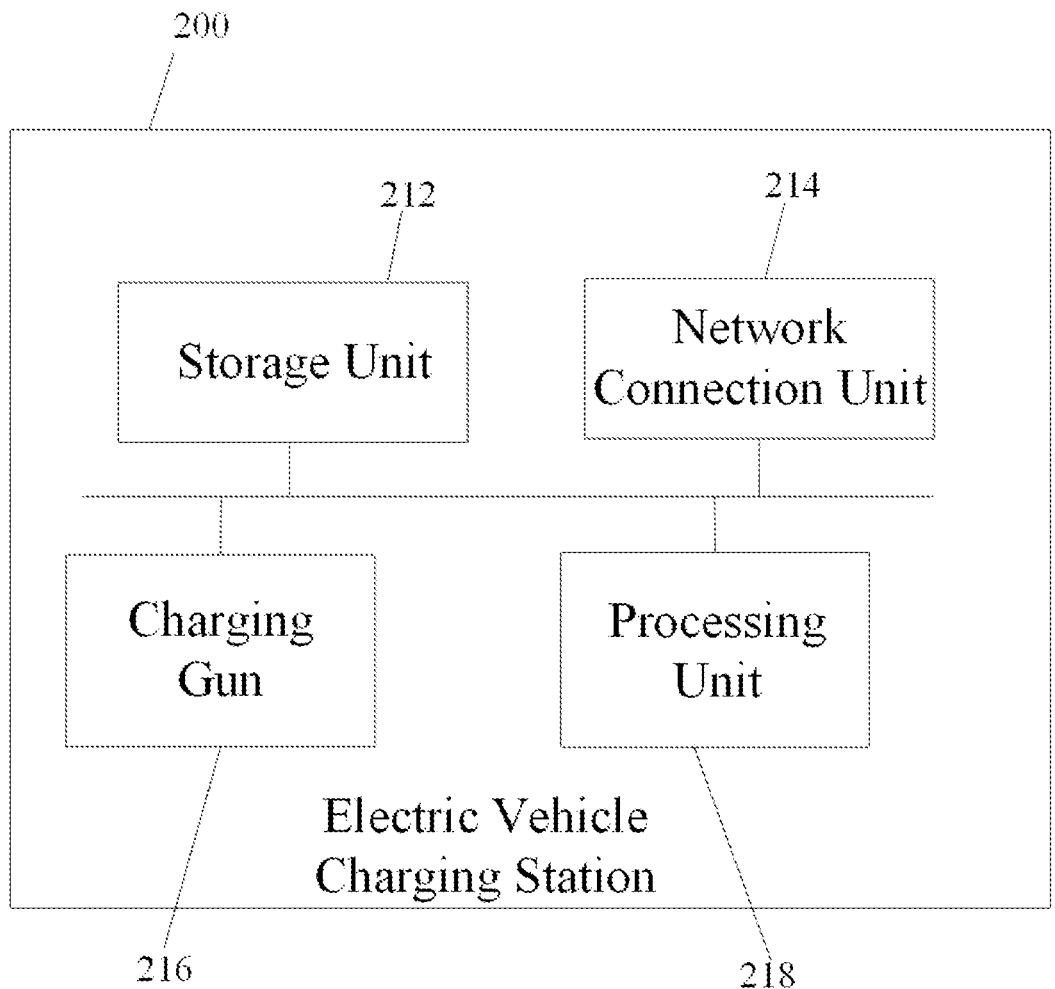
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the first charging station 112 and the second charging station 114, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data, such as related information of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the charging management method of the electric vehicle charging stations of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited to this. In one embodiment, the processing unit 216 may use the network connection unit 214 to transmit the power state of the corresponding electric vehicle through a network for a cloud management server, such as the cloud server 130, for subsequent charging management. In another embodiment, the processing unit 216 can obtain the power parameter of a charging operation from the server 130, determine the output power according to the power parameter received from the server 130, and output the power to at least one electric vehicle through the charging gun 216 to perform the charging operation.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
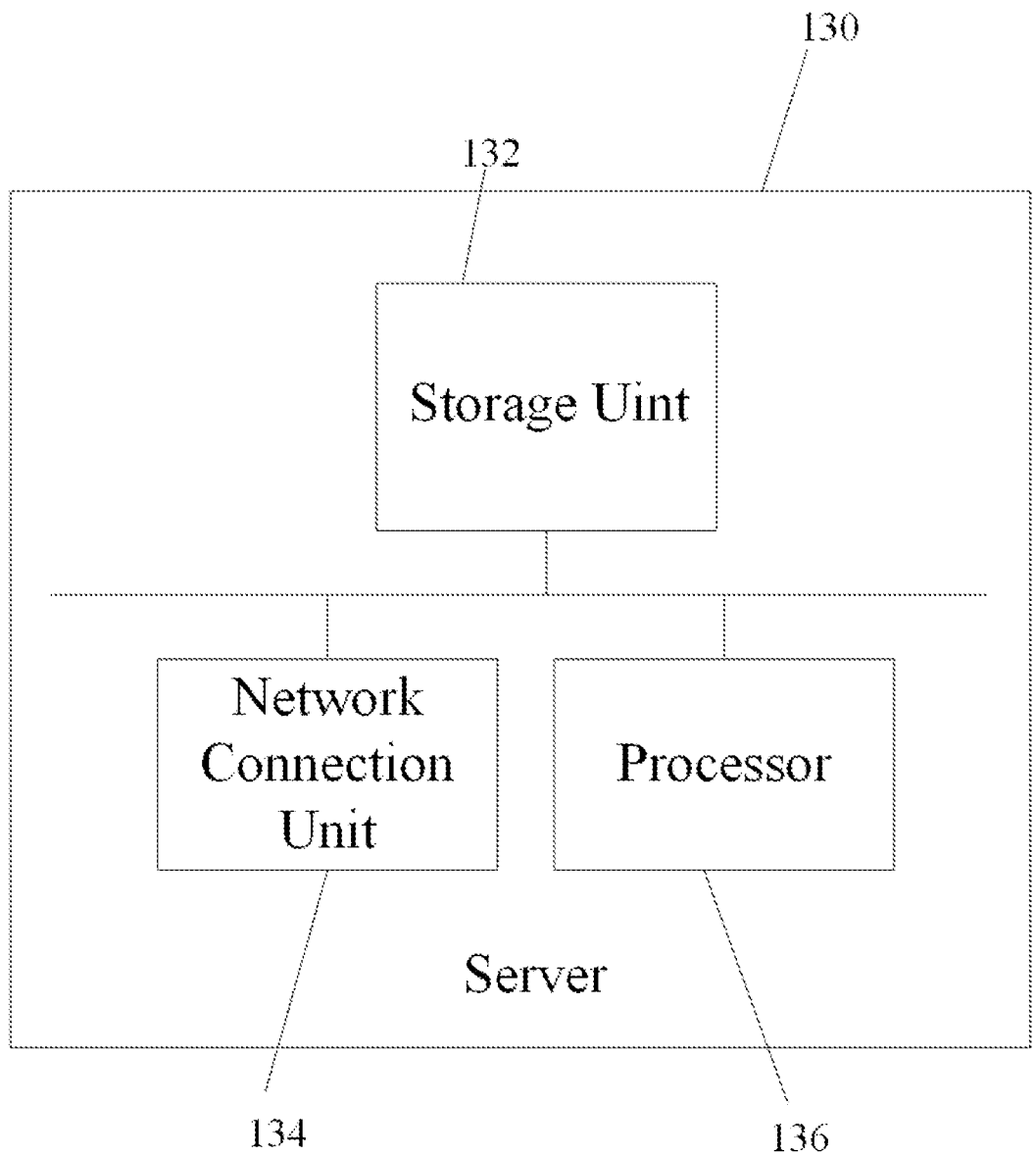
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device or a specific electric vehicle charging station, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. The server 130 can connect to and communicate with the electric vehicle charging stations 112 and 114 via the network 120, such as a wired network, a telecommunication network, and a wireless network, such as a Wi-Fi network by using the network connection unit 134, thus to transmit related data/signals/commands to the respective electric vehicle charging stations through the network 120 to control whether the electric vehicle charging station outputs power at a specify output power efficiency to charge an electric vehicle. The processor 136 can control the related operations of software and hardware in the server 130, and perform the charging management methods for electric vehicle charging stations of the invention, which will be discussed later. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
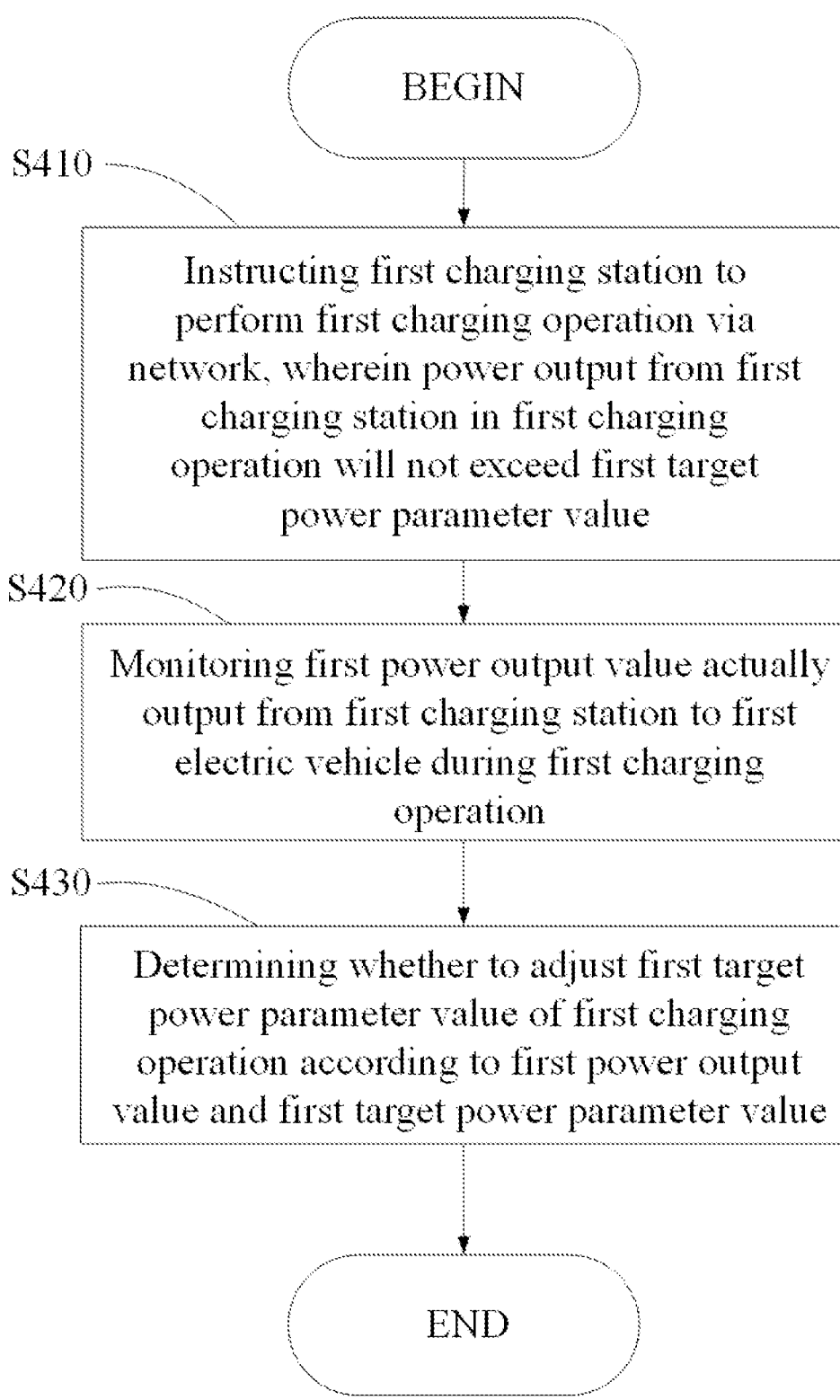
FIG. 4 is a flowchart of an embodiment of a charging management method for electric vehicle charging stations of the invention.

FIG. 4 is a flowchart of an embodiment of a charging management method for electric vehicle charging stations of the invention. The charging management method for electric vehicle charging stations of the invention is applicable to a charging field with a plurality of electric vehicle charging stations, and the charging field has a power limit. The respective electric vehicle charging station in the charging field can be electrically coupled with a remote server via a network.

In step S410, the server instructs a first charging station of the electric vehicle charging stations to perform a first charging operation for a first electric vehicle via the network. It is noted that, the server sets a first target power parameter value corresponding to the first charging operation. In some embodiments, the first target power parameter value may be an ampere value. In some embodiments, the initial first target power parameter value may be the upper power limit value of the first charging station. In the first charging operation, the power output from the first charging station to the first electric vehicle will not exceed the first target power parameter value. It is reminded that, in some embodiments, the server may first receive a charging request from the first charging station or a mobile device, so as to instruct the first charging station to perform the first charging operation in response to the charging request. In some embodiments, the user can connect the electric vehicle and the charging station to each other, such as inserting a charging gun into the charging interface of the electric vehicle, to send a charging request corresponding to the charging station to the server. In some embodiments, the user can scan a QR code on the charging station through the scanning function of an application to generate the above-mentioned charging request, thereby starting a charging operation. In some embodiments, the user can select a specific charging station through the application and execute an activation function to generate the above-mentioned charging request, thereby starting a charging operation. Then, in step S420, the server monitors the actual output value from the first charging station to the first electric vehicle in the first charging operation. As mentioned above, the power output from the first charging station to the first electric vehicle in the first charging operation will not exceed the first target power parameter value. In step S430, it is determined whether to adjust the first target power parameter value of the corresponding first charging operation according to the first target power parameter value and the first power output value.

Figure 5:
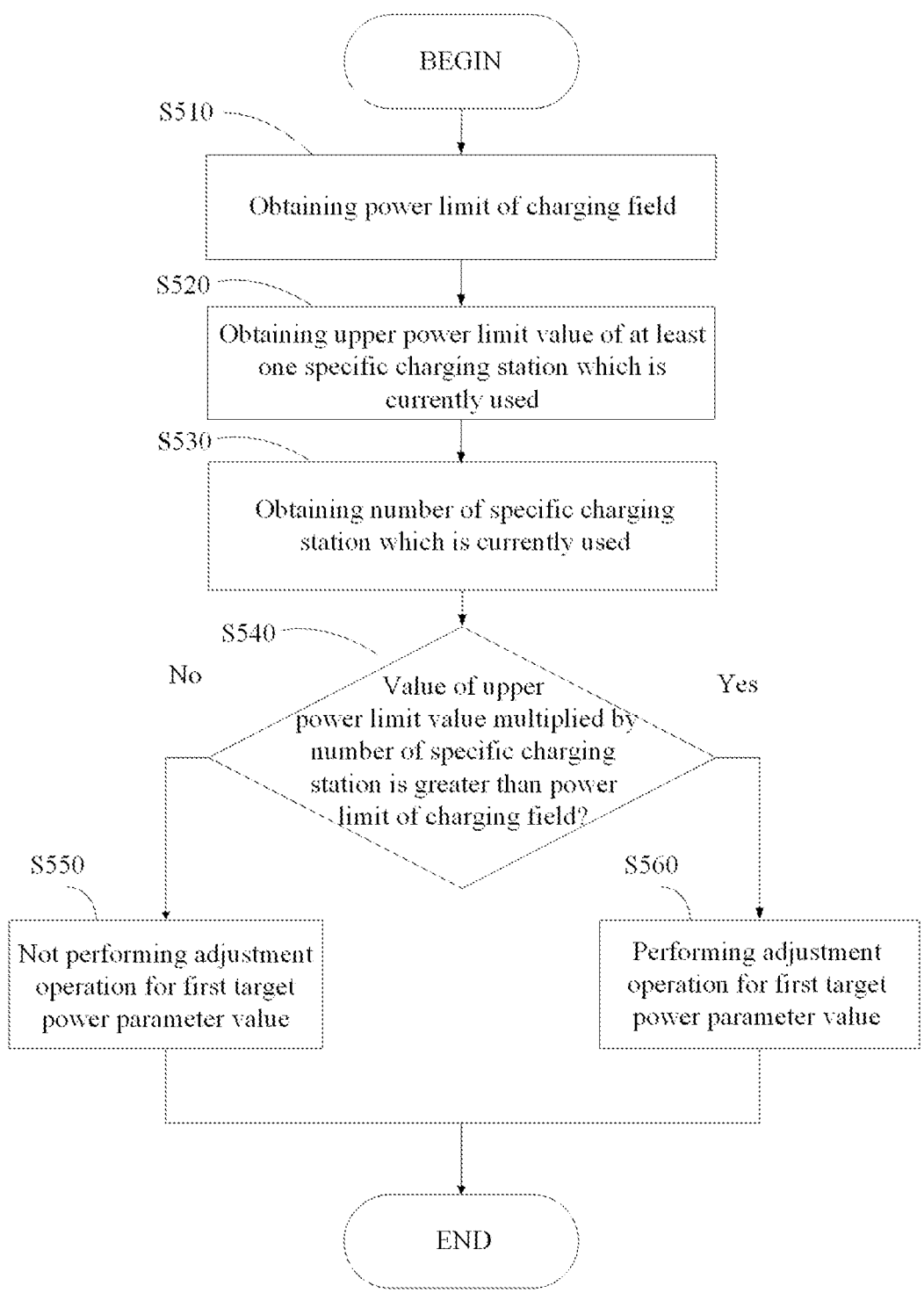
FIG. 5 is a flowchart of another embodiment of a charging management method for electric vehicle charging stations of the invention.

FIG. 5 is a flowchart of another embodiment of a charging management method for electric vehicle charging stations of the invention. The charging management method for electric vehicle charging stations of the invention is applicable to a charging field with a plurality of electric vehicle charging stations, and the charging field has a power limit. The respective electric vehicle charging station in the charging field can be electrically coupled with a remote server via a network. In this embodiment, it is determined whether to perform the adjustment operation of the target power parameter according to the actual operation situation of the electric vehicle charging stations in the charging field.

In step S510, the server obtains the power limit of the charging field, and in step S520, obtains the upper power limit value of at least one specific charging station in the charging field. As mentioned, charging stations of different brands and models may have different upper power limit values and lower power limit values. It is reminded that, in some embodiments, the power limit of the charging field and the upper power limit value of the respective specific charging station can be recorded in advance in a storage unit of the server (not shown in the figure). In step S530, the number of the specific charging stations currently in use in the charging field is obtained. The server can determine whether to perform the adjustment operation for the first target power parameter value based on the number of the specific charging stations being used in the electric vehicle charging stations, the upper power limit value of the specific charging station, and the power limit of the charging field. Then, in step S540, the server determines whether a value of the upper power limit value multiplied by the number of the specific charging stations being used is greater than the power limit of the charging field. When the value of the upper power limit value multiplied by the number of the specific charging stations in use is not greater than the power limit of the charging field (No in step S540), in step S550, the adjustment operation for the first target power parameter value is not performed. When the value of the upper power limit value multiplied by the number of the specific charging stations in use is greater than the power limit of the charging field (Yes in step S540), in step S560, the adjustment operation for the first target power parameter value is performed.

Figure 6:
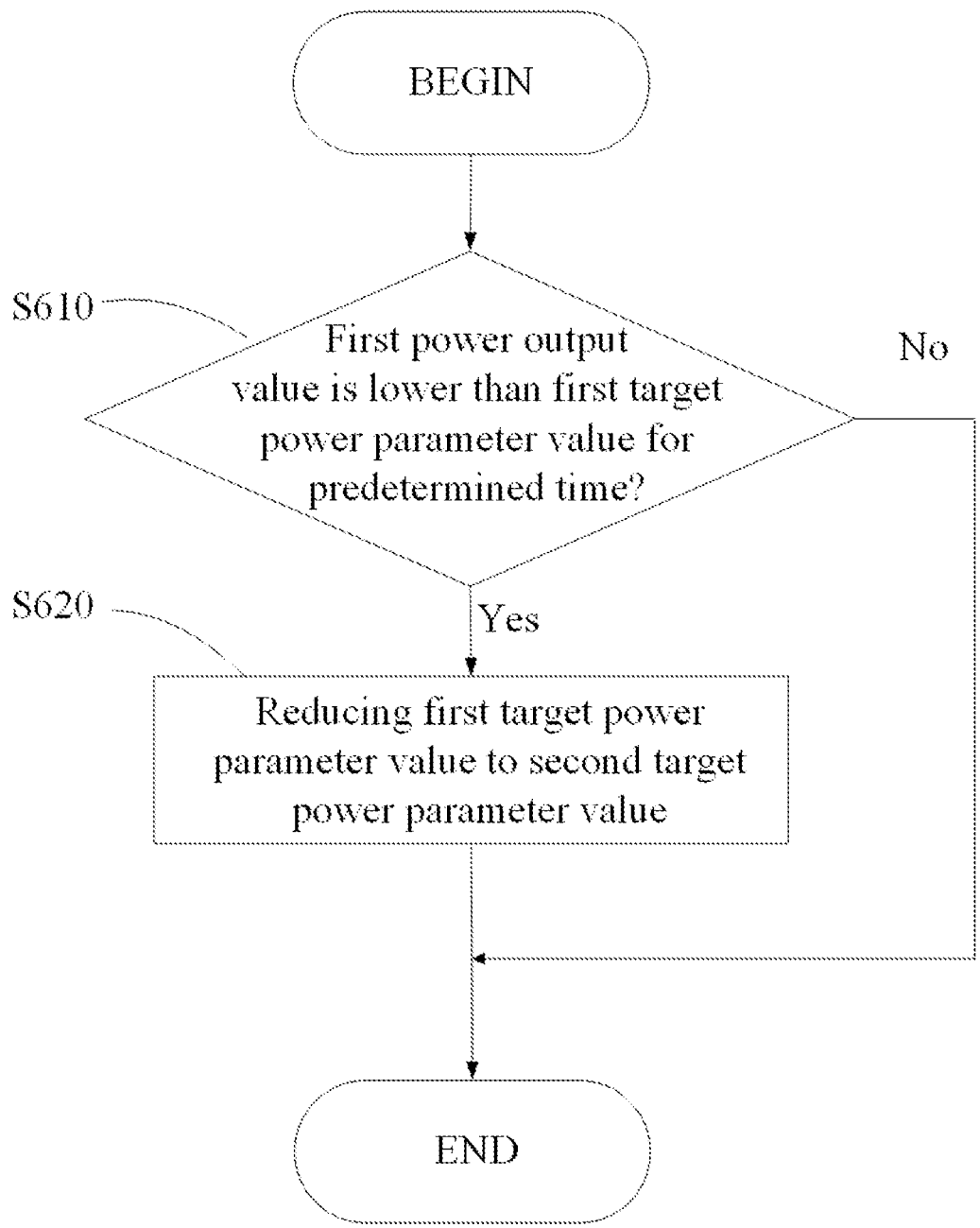
FIG. 6 is a flowchart of an embodiment of a method for adjusting target power parameter of the invention.

FIG. 6 is a flowchart of an embodiment of a method for adjusting target power parameter of the invention.

In step S610, the server determines whether a first power output value actually output by the first charging station to the first electric vehicle is lower than the first target power parameter value for a predetermined time. It is noted that, in some embodiments, the predetermined time can be set according to different time periods. For example, the predetermined time can be set to 30 minutes during peak hours, and the predetermined time can be set to 1 hour during off-peak hours. It is understood that, the aforementioned predetermined time is only an example of this case, and the present invention is not limited thereto. When the first power output value is not lower than the first target power parameter value for a predetermined time (No in step S610), the process ends. When the first power output value is lower than the first target power parameter value for a predetermined time (Yes in step S610), in step S620, the first target power parameter value is reduced to a second target power parameter value. Similarly, when the second target power parameter value is set for the first charging operation, the power actually output by the first charging station to the first electric vehicle will not exceed the second target power parameter value.

Figure 7:
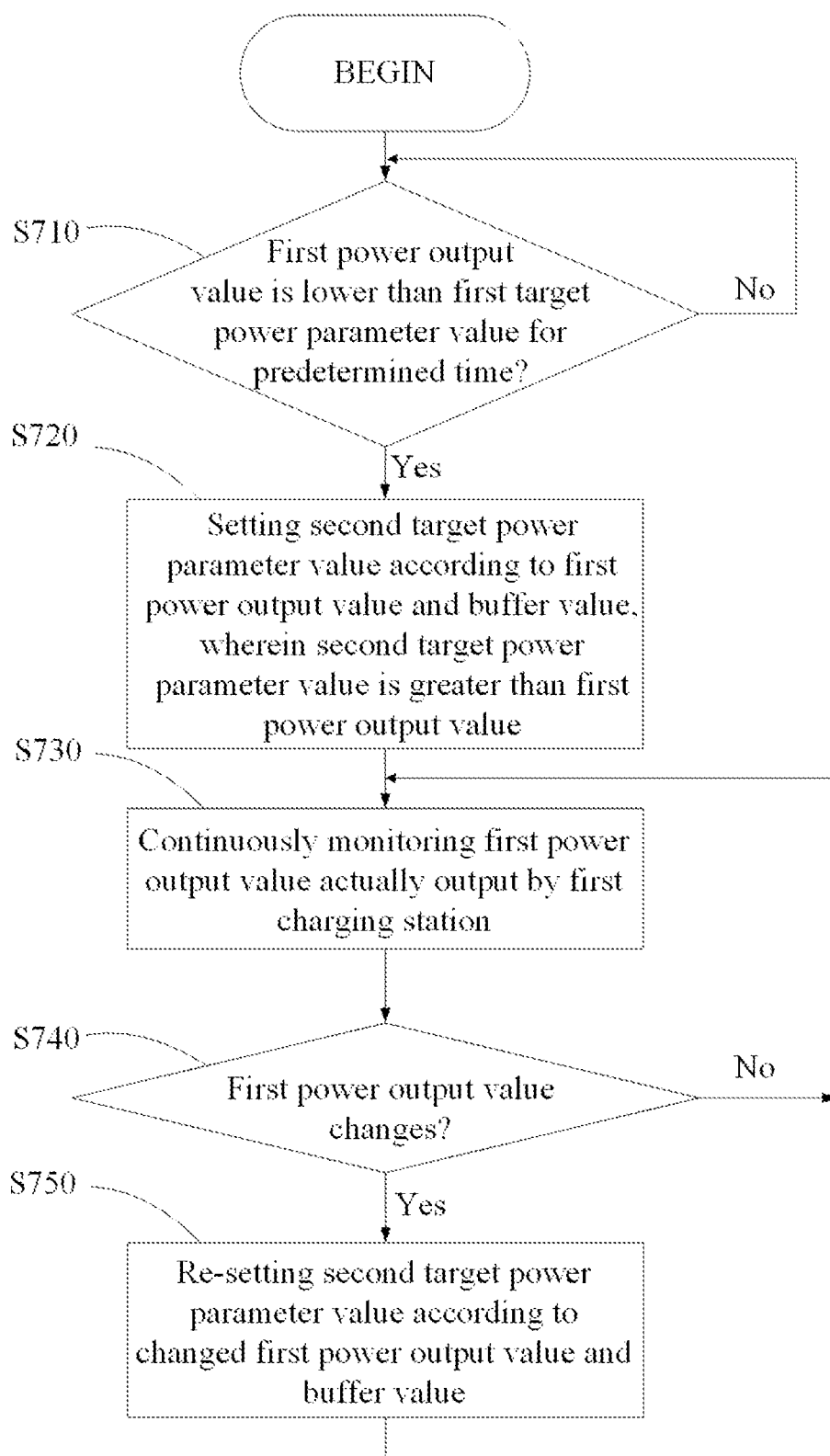
FIG. 7 is a flowchart of another embodiment of a method for adjusting target power parameter of the invention.

FIG. 7 is a flowchart of another embodiment of a method for adjusting target power parameter of the invention.

In step S710, the server determines whether the first power output value actually output by the first charging station to the first electric vehicle is lower than the first target power parameter value for a predetermined time. Similarly, in some embodiments, the predetermined time can be set according to different time periods. When the first power output value is not lower than the first target power parameter value for a predetermined time (No in step S710), the procedure remains at step S710. When the first power output value is lower than the first target power parameter value for a predetermined time (Yes in step S710), in step S720, a second target power parameter value is set according to the first power output value and a buffer value, wherein the second target power parameter value is lower than the first target power parameter value and higher than the first power output value actually output by the current first charging station. It is noted that, the purpose of setting the buffer value is to prevent electric vehicles from suddenly requesting more power from the charging station, which will cause the overall power consumption of the charging field to exceed the power limit. After that, in step S730, the server continuously monitors the first power output value actually output by the first charging station to the first electric vehicle in the first charging operation via the network, and in step S740, determines whether the first power output value has changed. When the first power output value has not changed (No in step S740), the procedure goes to step S730. When the first power output value changes (Yes in step S740), in step S750, the second target power parameter value is re-set according to the changed first power output value and the buffer value. It must be noted that, in some embodiments, the setting of the second target power parameter value in step S750 can be adjusted downward or upward, but the re-set second target power parameter value must be lower than the original first target power parameter value. After that, the procedure goes to step S730.

Figure 8:
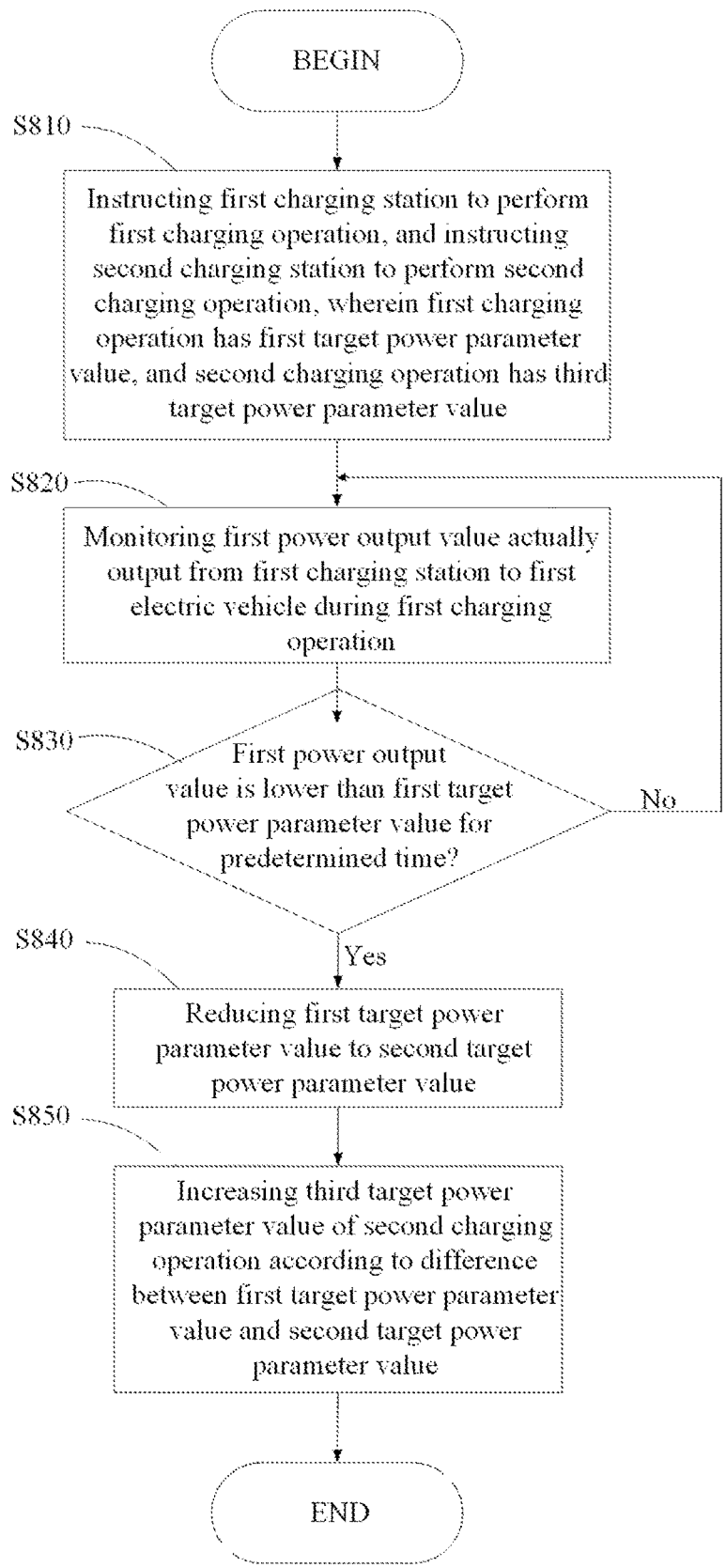
FIG. 8 is a flowchart of another embodiment of a charging management method for electric vehicle charging stations of the invention.

FIG. 8 is a flowchart of another embodiment of a charging management method for electric vehicle charging stations of the invention. The charging management method for electric vehicle charging stations of the invention is applicable to a charging field with a plurality of electric vehicle charging stations, and the charging field has a power limit. The respective electric vehicle charging station in the charging field can be electrically coupled with a remote server via a network.

First, in step S810, the server instructs a first charging station to perform a first charging operation for a first electric vehicle via the network, in which the server sets a first target power parameter value for the first charging operation. In addition, the server instructs a second charging station to perform a second charging operation for a second electric vehicle via the network, in which the server sets a third target power parameter value for the second charging operation. It is noted that, in some embodiments, the target power parameter value may be an ampere value. In the second charging operation, the power output from the second charging station to the second electric vehicle will not exceed the third target power parameter value. Similarly, in some embodiments, the server may first receive a charging request from the charging station or the mobile device, so as to instruct the charging station to perform the charging operation in response to the charging request. Then, in step S820, the server monitors a first power output value actually output from the first charging station to the first electric vehicle during the first charging operation via the network. As mentioned above, the power output from the first charging station to the first electric vehicle in the first charging operation will not exceed the first target power parameter value. After that, in step S830, the server determines whether the first power output value actually output by the first charging station to the first electric vehicle is lower than the first target power parameter value for a predetermined time. Similarly, in some embodiments, the predetermined time can be set according to different time periods. When the first power output value is not lower than the first target power parameter value for a predetermined time (No in step S830), the procedure remains at step S820. When the first power output value is lower than the first target power parameter value for a predetermined time (Yes in step S830), in step S840, the first target power parameter value is reduced to a second target power parameter value. In some embodiments, the second target power parameter value can be set according to the first power output value and a buffer value, wherein the second target power parameter value is lower than the first target power parameter value and higher than the current first power output value actually output by the first charging station. When the first charging operation is set to the second target power parameter value, the power actually output by the first charging station to the first electric vehicle will not exceed the second target power parameter value. It is reminded that, the purpose of setting the buffer value is to prevent electric vehicles from suddenly requesting more power from the charging station, which will cause the overall power consumption of the charging field to exceed the power limit. Then, in step S850, the server increases the third target power parameter value of the second charging operation according to a difference between the first target power parameter value and the second target power parameter value. It is reminded that since the third target power parameter value of the corresponding second charging operation is increased, the actual power output from the second charging station to the second electric vehicle in the second charging operation can also be increased. The power output from the second charging station to the second electric vehicle will not exceed the adjusted third target power parameter value.

Therefore, the charging management methods and systems for electric vehicle charging stations of the invention can dynamically allocate output power according to the charging request in the charging field, so as to perform a load adjustment operation according to the upper power limit value and the lower power limit value of the electric vehicle charging station, thereby avoiding field power jumps that may be caused when later vehicles enter the load adjustment operation in the charging field.

Charging management methods for electric vehicle charging stations, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the fount of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging management method for electric vehicle charging stations for use in a charging field with a plurality of electric vehicle charging stations, in which the respective electric vehicle charging station is connected to a server via a network, comprising:

instructing a first charging station to perform a first charging operation for a first electric vehicle via a network by the server, wherein the server sets a first target power parameter value corresponding to the first charging operation, and the power output from the first charging station to the first electric vehicle in the first charging operation will not exceed the first target power parameter value;

monitoring a first power output value actually output from the first charging station to the first electric vehicle during the first charging operation by the server; and determining whether to adjust the first target power parameter value of the first charging operation according to the first power output value and the first target power parameter value, wherein the method further comprises:

determining whether the first power output value is lower than the first target power parameter value for a predetermined time;

reducing the first target power parameter value to a second target power parameter value when the first power output value is lower than the first target power parameter value for the predetermined time;

instructing a second charging station among the electric vehicle charging stations to perform a second charging operation for a second electric vehicle via the network by the server, wherein the server sets a third target power parameter value corresponding to the second charging operation, and the power output from the second charging station to the second electric vehicle in the second charging operation is not greater than the third target power parameter value; and increasing the third target power parameter value corresponding to the second charging operation according to a difference between the first target power parameter value and the second target power parameter value.

2. The method of claim 1, further comprising setting the second target power parameter value according to the first power output value and a buffer value, wherein the second target power parameter value is greater than the first power output value.

3. The method of claim 2, further comprising:
continuously monitoring the first power output value actually output by the first charging station to the first electric vehicle during the first charging operation via the network by the server;

determining whether the first power output value has changed; and re-setting the second target power parameter value according to the changed first power output value and the buffer value when the first power output value changes.

4. The method of claim 1, further comprising determining whether to perform the adjustment operation corresponding to the first target power parameter value according to the number of at least one specific charging station being used in the electric vehicle charging stations, a upper power limit value of the at least one specific charging station, and a power limit of the charging field.

5. The method of claim 4, further comprising performing the adjustment operation corresponding to the first target power parameter value when a value of the upper power limit value multiplied by the number of the at least one specific charging station being used is greater than the power limit of the charging field.

6. A charging management system for electric vehicle charging stations for use in a charging field with a plurality of electric vehicle charging stations, comprising:
at first charging station; and
a server connecting to the respective electric vehicle charging stations via a network, instructing the first charging station to perform a first charging operation for a first electric vehicle via the network, wherein a first target power parameter value corresponding to the first charging operation is set, and the power output from the first charging station to the first electric vehicle in the first charging operation will not exceed the first target power parameter value, monitoring a first power output value actually output from the first charging station to the first electric vehicle during the first charging operation, and determining whether to adjust the first target power parameter value of the first charging operation according to the first power output value and the first target power parameter value, wherein the server further determines whether the first power output value is lower than the first target power parameter value for a predetermined time, reduces the first target power parameter value to a second target power parameter value when the first power output value is lower than the first target power parameter value for the predetermined time, instructs a second charging station among the electric vehicle charging stations to perform a second charging operation for a second electric vehicle via the network, wherein the server sets a third target power parameter value corresponding to the second charging operation, and the power output from the second charging station to the second electric vehicle in the second charging operation is not greater than the third target power parameter value, and increases the third target power parameter value corresponding to the second charging operation according to a difference between the first target power parameter value and the second target power parameter value.

7. The system of claim 6, wherein the server further sets the second target power parameter value according to the first power output value and a buffer value, wherein the second target power parameter value is greater than the first power output value.

8. The system of claim 7, wherein the server further continuously monitors the first power output value actually output by the first charging station to the first electric vehicle during the first charging operation via the network, determines whether the first power output value has changed, and re-sets the second target power parameter value according to the changed first power output value and the buffer value when the first power output value changes.

9. The system of claim 6, wherein the server further determines whether to perform the adjustment operation corresponding to the first target power parameter value according to the number of at least one specific charging station being used in the electric vehicle charging stations, a upper power limit value of the at least one specific charging station, and a power limit of the charging field.

10. The system of claim 9, wherein the server further performs the adjustment operation corresponding to the first target power parameter value when a value of the upper power limit value multiplied by the number of the at least one specific charging station being used is greater than the power limit of the charging field.

11. A non-transitory machine-readable storage medium comprising a computer program, which, when executed, causes a device to perform a charging management method for electric vehicle charging stations for use in a charging field with a plurality of electric vehicle charging stations, in which the respective electric vehicle charging station is connected to a server via a network, wherein the method comprises:
instructing a first charging station to perform a first charging operation for a first electric vehicle via a network, wherein a first target power parameter value corresponding to the first charging operation is set, and the power output from the first charging station to the first electric vehicle in the first charging operation will not exceed the first target power parameter value;

monitoring a first power output value actually output from the first charging station to the first electric vehicle during the first charging operation; and determining whether to adjust the first target power parameter value of the first charging operation according to the first power output value and the first target power parameter value, wherein the method further comprises:

determining whether the first power output value is lower than the first target power parameter value for a predetermined time;

reducing the first target power parameter value to a second target power parameter value when the first power output value is lower than the first target power parameter value for the predetermined time;

instructing a second charging station among the electric vehicle charging stations to perform a second charging operation for a second electric vehicle via the network by the server, wherein the server sets a third target power parameter value corresponding to the second charging operation, and the power output from the second charging station to the second electric vehicle in the second charging operation is not greater than the third target power parameter value; and increasing the third target power parameter value corresponding to the second charging operation according to a difference between the first target power parameter value and the second target power parameter value.

* * * * *